June 2, 1959
C. L. PLACE
2,888,786
TOOL REST
Filed March 18, 1955
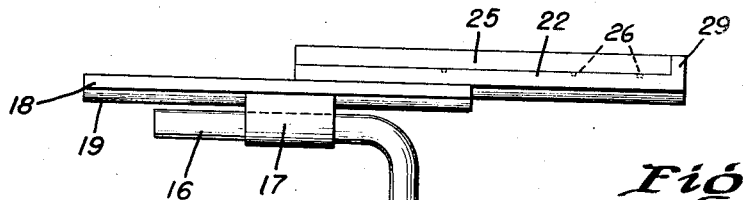
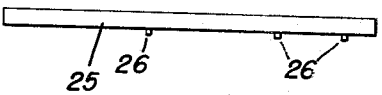
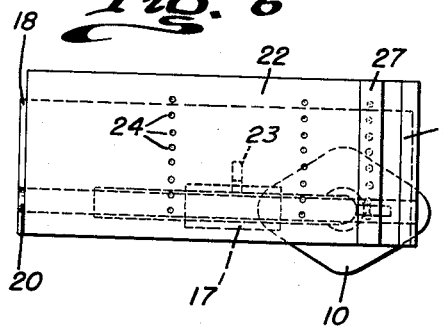
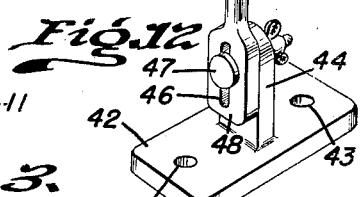
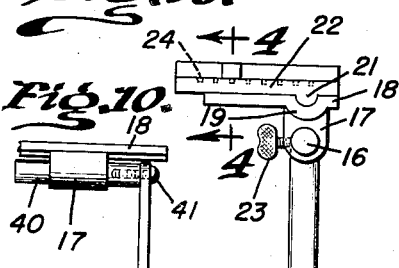
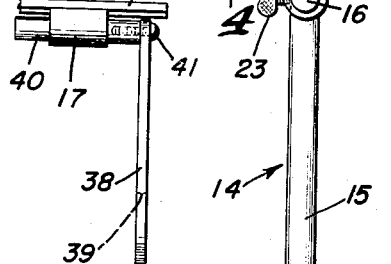
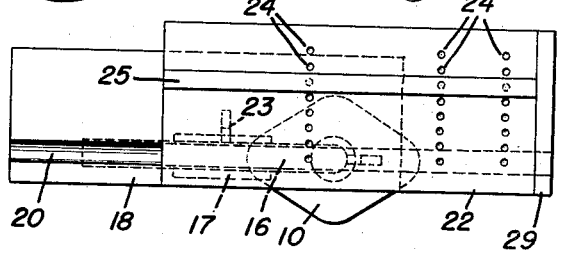
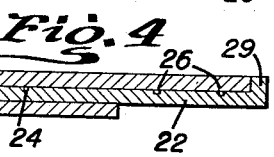
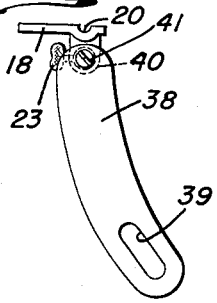
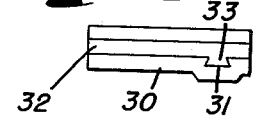
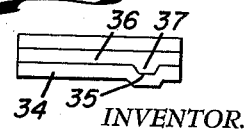
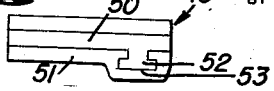
INVENTOR.
Clarence L. Place
BY Victor J. Evans & Co.
ATTORNEYS United States Patent Office 2,888,786
Patented June 2, 1959

2,888,786
TOOL REST
Clarence L. Place, Superior, Wis.
Application March 18, 1955, Serial No. 495,311
1 Claim. (Cl. 51—220)

This invention relates to a tool rest for use with grinders, lathes and the like.

The object of the invention is to provide a tool rest which will support a tool at the proper position with respect to a machine such as a lathe or grinder, the rest being adjustable so that the tool can be supported at different positions with respect to the various machines with which it is being used.

Another object of the invention is to provide a tool rest which will support a tool such as a tool being sharpened by a grinding wheel so that the proper edge can be formed or ground on the cutting tool, the rest being adjustable whereby the tool can be supported at different positions with respect to the machine.

A further object of the invention is to provide a tool rest which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the tool rest, constructed according to the present invention.

Figure 2 is an end elevational view of the tool rest.

Figure 3 is a top plan view of the tool rest.

Figure 4 is a sectional view taken on the line 4—4 of Figure 2.

Figure 5 is a side elevational view of one of the support members.

Figure 6 is a top plan view illustrating the shelf in adjusted position.

Figure 7 is an elevational view of one of the cross pieces or support members.

Figure 8 is an end elevational view illustrating a modified keyway which is in the form of a dove-tailed joint.

Figure 9 is an end elevational view of a further modified keyway which may have a trapezoidal shape.

Figure 10 is a fragmentary elevational view illustrating a further modification wherein a bracket is used as when the rest is to be attached to the machine such as the grinder or lathe.

Figure 11 is a view taken at right angles to the view shown in Figure 10.

Figure 12 is a fragmentary perspective view illustrating a modified base arrangement.

Figure 13 is an elevational view illustrating a modified keyway.

Referring in detail to the drawings, the numeral 10 designates a base which is provided with a plurality of apertures 11 whereby suitable securing elements such as screws or bolts can be extended through the apertures 11 for attaching the base 10 to a table, or to a suitable machine. Formed integral with the base 10 and extending therefrom is a hollow casing 12 which is adapted to receive therein the vertical portion 15 of an L-shaped bar 14, there being a portion 16 arranged at right angles with respect to the portion 15. A set screw 13 extends through the casing 12 for engagement with the portion 15 of the bar 14 for maintaining the bar 14 immobile in its various adjusted positions.

Arranged in engagement with the portion 16 of the bar 14 is a clamp 17, there being a set screw 23 extending through the clamp 17 and into engagement with the portion 16, Figure 2. Secured to the clamp 17 is a platform 18 which may be provided with a longitudinally extending enlargement or shoulder 19 that helps to reinforce the platform 18. The upper surface of the platform 18 is provided with a longitudinally extending recessed portion or channel 20 which slidably receives therein a rib 21 which depends from a movable or adjustable shelf 22.

There is provided in the shelf 22 a plurality of spaced apart apertures or openings 24, and movably mounted on the shelf 22 are support members 25 and 27, Figures 5 and 7. The support member 25 may have pins 26 depending therefrom for engagement with the apertures 24, and the support member 27 is also provided with pins 28 which are adapted to seat in the apertures 24 so as to maintain the support members immobile in their various adjusted positions. A flange 29 may extend upwardly from an end of the shelf 22. The support members 25 and 27, and the flange 29 can be used to support a tool such as a tool being sharpened by a grinder or the like.

Referring to Figure 8 of the drawings there is shown a modification wherein the numeral 30 designates the platform which can be used in lieu of the platform 18, and the platform 30 is provided with a longitudinally extending slot 31. Adjustably mounted on the platform 30 is a shelf 32 which has a rib 33 slidably mounted in the slot 31, and it will be seen that the parts 31 and 33 define a dovetail joint.

In Figure 9 there is shown a further modified connection between a platform 34 and a shelf 36. Thus, the platform 34 has a longitudinally extending slot or groove 35 in its upper surface for slidably receiving therein a longitudinally extending rib 37 which depends from the shelf 36. The parts 35 and 37 may have a trapezoidal shape.

Referring to Figures 10 and 11 of the drawings there is shown a modified means of attaching the support to a suitable machine, wherein the numeral 38 designates an arcuate bracket which is provided with a slot 39 in its lower end. A suitable securing element such as a bolt can be extended through the slot 39 and into engagement with a machine. A bolt 41 may connect the upper end of the bracket 38 to a rod 40, and the rod 40 may have the clamp 17 arranged in engagement therewith, the clamp 17 having the platform 18 secured thereto.

From the foregoing it is apparent that there has been provided a tool rest and in use the base 10 can be secured to any suitable supporting structure by means of securing elements which extend through the apertures 11. The bar 14 can be adjusted in the casing 12 and held in its adjusted position by means of the thumb screw 13. The clamp 17 connects the platform 18 to the bar 14, and the shelf 22 is adjustably mounted on the platform 18. The support members 25 and 27 can be mounted at different positions on the shelf 22, and a tool such as a tool to be sharpened can be supported by the members 25 and 27 to maintain the tool in its proper angular position with respect to a grinder or other machine. The shelf 22 is slidably connected to the platform 18 through the medium of the rib 19 and channel 20. However, in Figure 8 there is shown a modified connection wherein the dovetail members 31 and 33 are used for slidably connecting the platform and shelf together. In Figure 9 there is shown a further modification wherein the trapezoidal shaped portions 35 and 37 are used for effecting the sliding connection. Figures 10 and 11 show the bracket 28 which can be used for securing the platform 18 directly to a machine of any construction.

The device of the present invention can be used wherever a tool rest is needed. For example in sharpening tools such as blades and chisels on a grinder, the operator often has difficulty in obtaining a true edge due to the inability of the operator to hold the tool in the proper alignment with respect to the grinding wheel. With applicant's invention this difficulty is eliminated since the tool can be placed on the shelf 22 which slides back and forth with the tool. If desired the tool may be fastened to the sliding rest or platform. Thus, the tool will be maintained in its proper aligned position with respect to the grinding wheel. A C-clamp can be used for clamping a tool onto the rest. The members 25 and 27 serve to hold the tool at the desired angle with respect to the grinding wheel, and by loosening the thumb screw 23, the platform 18 and shelf 22 can be moved to different angular positions. The device can be separated from the grinder and fastened on a bench or table in front of the grinder or can be fastened on the machine itself, and the bar 14 can be adjusted to different heights. The bracket 38 can be used for attaching the rest directly to the grinder or other machine as when a bench is not available.

Referring to Figure 12 of the drawings there is shown a further modification wherein the numeral 42 designates a base which is provided with apertures 43 through which securing elements can be extended whereby the base 42 can be secured to any suitable supporting structure. An ear 44 extends upwardly from the base 42, and a bar 45 includes a lower flattened portion 48 which is provided with a slot 46, there being a bolt and nut assembly 47 extending through the slot 46 and through an opening in the ear 44. Thus, by loosening the bolt and nut assembly 47, the bar 45 can be moved to different adjusted positions.

Referring to Figure 13 of the drawings there is shown a further modified keyway which is indicated generally by the numeral 49, and the keyway 49 includes a platform 51 and a shelf 50. A T-shaped rib 52 depends from the shelf 50, and the rib 52 is mounted in a channel 53 in the platform 51.

Due to the provision of the adjustable arm or bar 45 shown in Figure 12, the rest can be adjusted to the proper distance from the grinding wheel.

I claim:

A tool rest consisting of an arcuate bracket having a slot in its lower end, said bracket being of uniform thickness throughout its entire length, said bracket adapted for mounting in a vertical plane, said slot adapted to have extended therethrough a first securing element, said first securing element adapted to engage a machine, a rod arranged contiguous to the upper end of said bracket, said rod being horizontally disposed, a second securing element connecting the upper end of said bracket to an end of said rod, said second securing element being horizontally disposed and threadedly engaging said rod, a clamp arranged intermediate the ends of said rod and connected to said rod, and a platform arranged above said clamp, said platform having a generally flat formation, said platform having an arcuate channel, said channel being spaced inwardly from the outer edges of said platform, said channel being offset from the center of the platform and adapted to slidably receive therein a rib which depends from a movable adjustable shelf, said platform being secured to said clamp, the longitudinal axis of said platform being arranged at right angles with respect to the longitudinal axis of the bracket.

References Cited in the file of this patent

UNITED STATES PATENTS

| 196,183 | Bidwell | Oct. 16, 1877 |
| 351,666 | Spaulding | Oct. 26, 1886 |
| 729,196 | Mathieu | May 26, 1903 |
| 833,726 | Bein | Oct. 23, 1906 |
| 979,880 | Olds | Dec. 27, 1910 |
| 1,282,489 | Strodel | Oct. 22, 1918 |
| 1,365,536 | Nielsen | Jan. 11, 1921 |
| 2,153,476 | Norman | Apr. 4, 1939 |
| 2,449,957 | Smiley, Jr. | Sept. 21, 1948 |
| 2,546,283 | Webster | Mar. 27, 1951 |
| 2,692,806 | Grace | Oct. 26, 1954 |

FOREIGN PATENTS

| 674,424 | Great Britain | June 25, 1952 |